Figure 1:
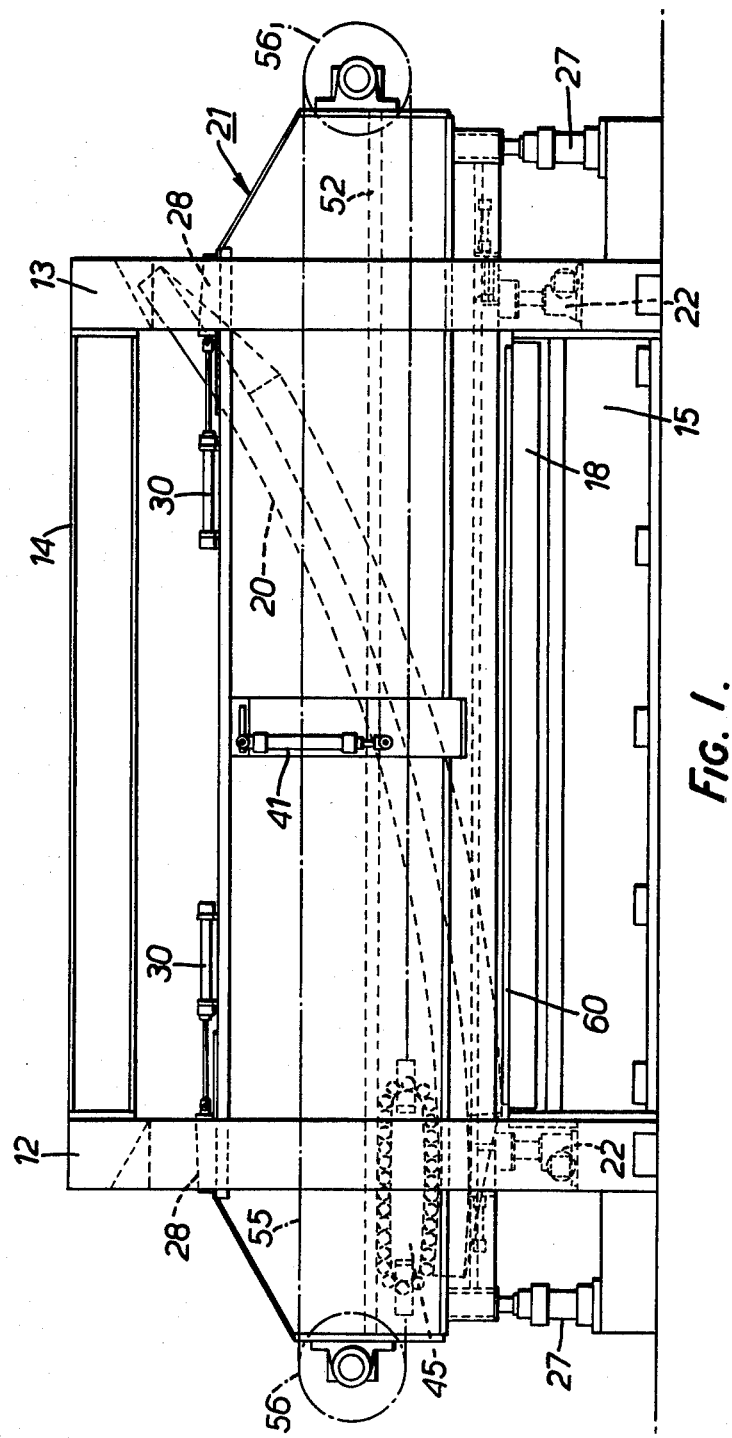

United States Patent [19]

Holton et al.

[11] Patent Number: 4,459,889
[45] Date of Patent: Jul. 17, 1984

[54] SHEAR

[75] Inventors: James A. Holton, Richmond; James C. Inman, Braithwell, both of England

[73] Assignee: Davy-Loewy Limited, Sheffield, England

[21] Appl. No.: 332,155

[22] Filed: Dec. 18, 1981

[30] Foreign Application Priority Data

Dec. 23, 1980 [GB] United Kingdom ............... 8041134

[51] Int. Cl.³ ............................................ B23D 15/08
[52] U.S. Cl. ...................................... 83/597; 83/627; 83/644
[58] Field of Search .................. 83/644, 627, 597, 601

[56] References Cited

U.S. PATENT DOCUMENTS

| 552,710 | 1/1896 | Jefferies | 83/627 |
|---|---|---|---|
| 736,536 | 8/1903 | McDonner . | |
| 2,922,458 | 1/1960 | Jensen . | |
| 3,316,791 | 5/1967 | Greis et al. | 83/644 |
| 3,678,792 | 7/1972 | Dvorak | 83/627 |
| 3,886,828 | 6/1975 | Muller | 83/644 |
| 3,913,438 | 10/1975 | Walters . | |
| 4,054,076 | 10/1977 | Kumabe | 83/644 |
| 4,079,649 | 3/1978 | Ishii et al. | 83/644 |

FOREIGN PATENT DOCUMENTS 82870 9/1895 Fed. Rep. of Germany .

Primary Examiner—Donald R. Schran
Attorney, Agent, or Firm—Lee, Smith & Zickert

[57] ABSTRACT

A cutting or shaping mechanism is described in which the cutting or pressing force is applied to a moving blade or shaping assembly over a limited part of the length of that assembly, including where the assembly is in engagement with the work. The application of the cutting or pressing force is moved progressively along the assembly to cause the assembly to roll on the work and progressively cut or apply pressure to the work. The invention is particularly applicable to a rolling cut shear having a single moving blade assembly or a pair of oppositely curved moving blade assemblies.

13 Claims, 13 Drawing Figures

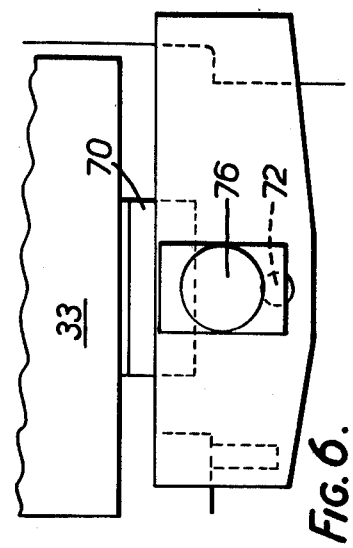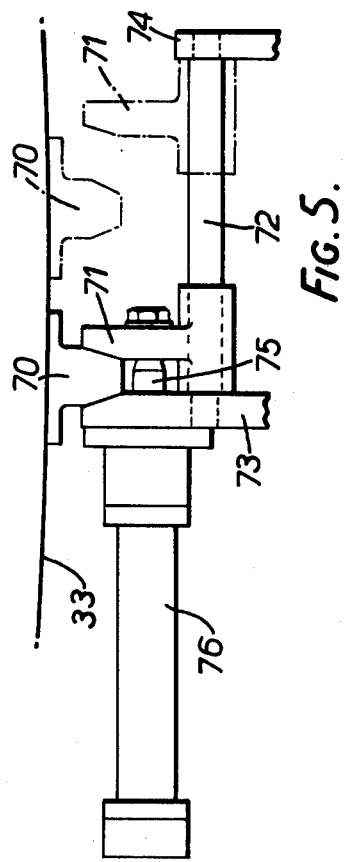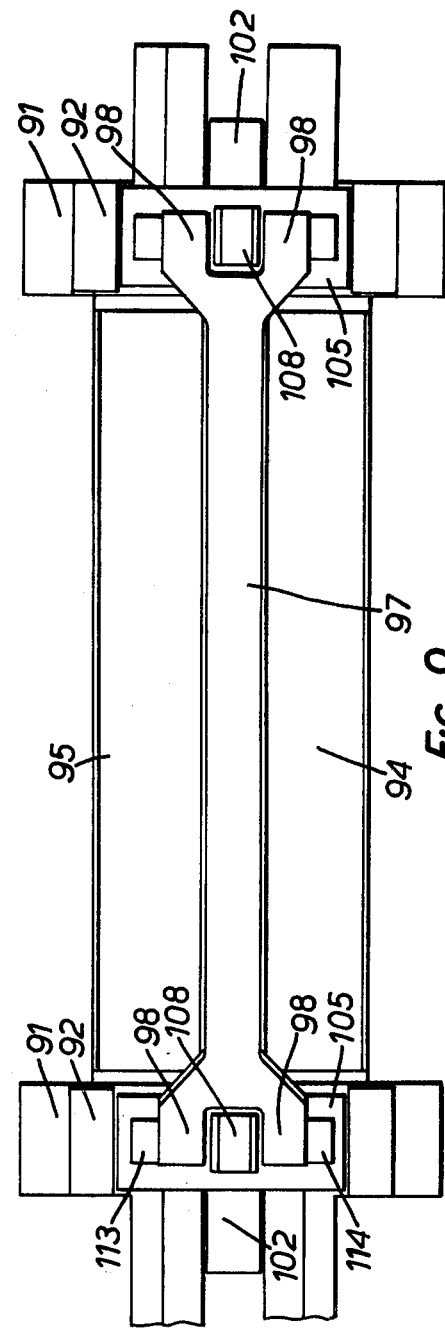

SHEAR

This invention relates to a cutting or pressing device and is particularly concerned with the construction of a rolling cut shear which, while being specially adapted for use as a crosscut shear, e.g. for plate, can be employed for other purposes, such as for side-trimming.

Rolling cut shears have long been used in the steel industry. A rolling cut shear normally has a fixed and straight lower blade and a cooperating moving upper blade having a curved edge. The moving blade is driven with a rolling action so that it approximately rolls over the work between the blades and progressively shears the work.

In previous rolling cut shears, the forces for moving the upper blade and for effecting the shear have been transmitted to the ends of the upper blade. Thus, in one known shear, the ends of the upper blade are coupled to eccentrics driven by electric motors. Such an arrangement is not ideal; firstly, the blade does not execute a truly rolling motion on the work, since to achieve such a motion of the blade the ends of the blade must be restrained to perform complicated movements which are not achievable by eccentrics; secondly, and because of the eccentric drives, the power required of the motors is far from uniform over the cutting stroke and, consequently, the motors are required to have high maximum powers, thirdly, because the drives must be capable of transmitting forces to the ends of the upper blade, when the ends are at their highest positions, the drives must be mounted well above the work with the result that the shear structure is unduly tall.

It has also been proposed to drive the upper blade by a hydraulic piston and cylinder assembly acting through a complicated linkage to the ends of that blade. That proposal resulted in a cheaper shear construction of smaller size than the eccentrically driven device, but still suffered from the disadvantages set out above, though to a lesser extent.

In the present invention, the cutting or pressing force is applied directly and progressively to a curved blade or press assembly where the assembly is in contact with the work. As a consquence, the assembly performs a truly rolling action over the work, the applied force is substantially uniform over the length of work to which it is applied, and the mechanism for applying the cutting or pressing force can be located adjacent the work.

Thus, in one aspect, the invention provides a rolling cut or press device in which in use the cutting or pressing force is applied to a curved moving blade or press assembly over a limited part of the length of that assembly including where the assembly is in engagement with the work, and the application of the cutting or pressing force is moved progressively along the blade or press assembly to cause the blade or press tool assembly to roll on the work and progressively to cut or apply pressure to the work.

In another aspect, the invention resides in a rolling cut shear having a fixed blade assembly on which the work to be sheared is disposed, a curved moving blade assembly, and a device for applying a force directly to the moving blade assembly over a limited part of the length of that assembly, the device being movable along the moving blade assembly to cause the assembly to roll on the work and to apply the shearing force progressively along the length of the blade assembly in order to shear the work.

In a further aspect of the invention, we provide a rolling cut shear device having two oppositely curved moving blade assemblies between which the work to be sheared is disposed, a device for applying a shearing force directly to one of the moving blade assemblies over a limited part of the length of that assembly and means for transferring an opposite shearing force to the other moving blade assembly, the device being movable along the moving blade assemblies to cause the assemblies to roll on the work and to apply the shearing force progressively along the length of the blade assemblies in order to shear the work.

Figure 2:
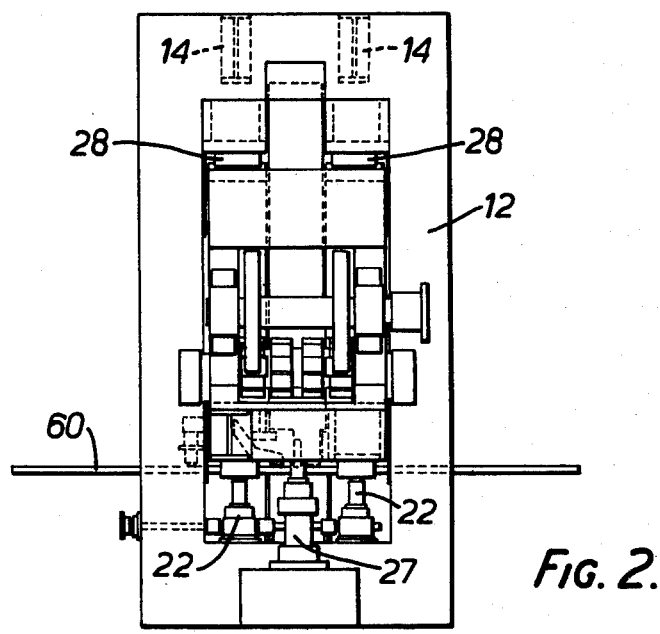
Figure 4:
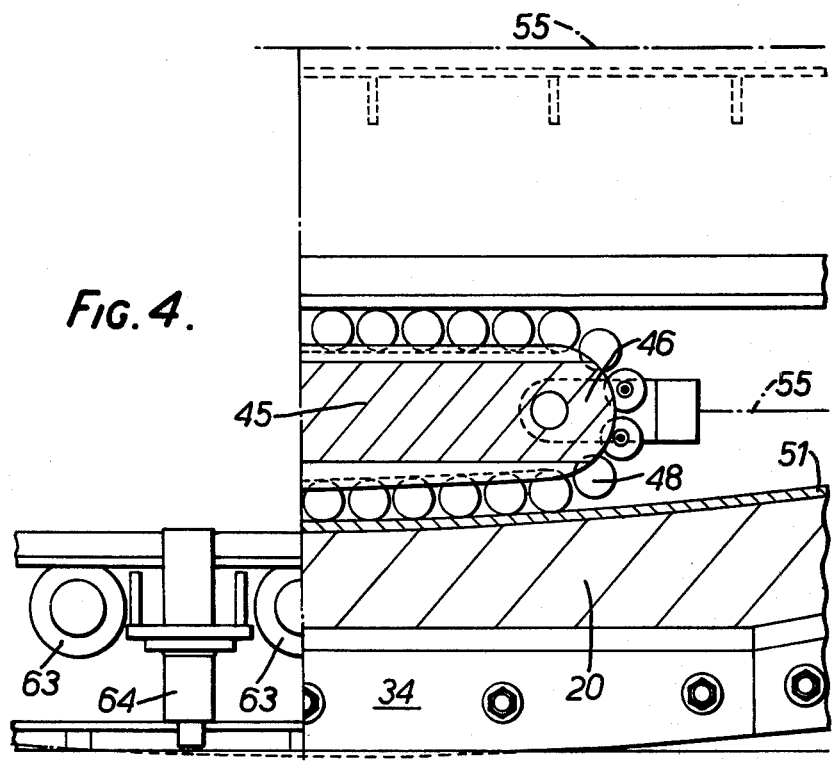
Figure 3:
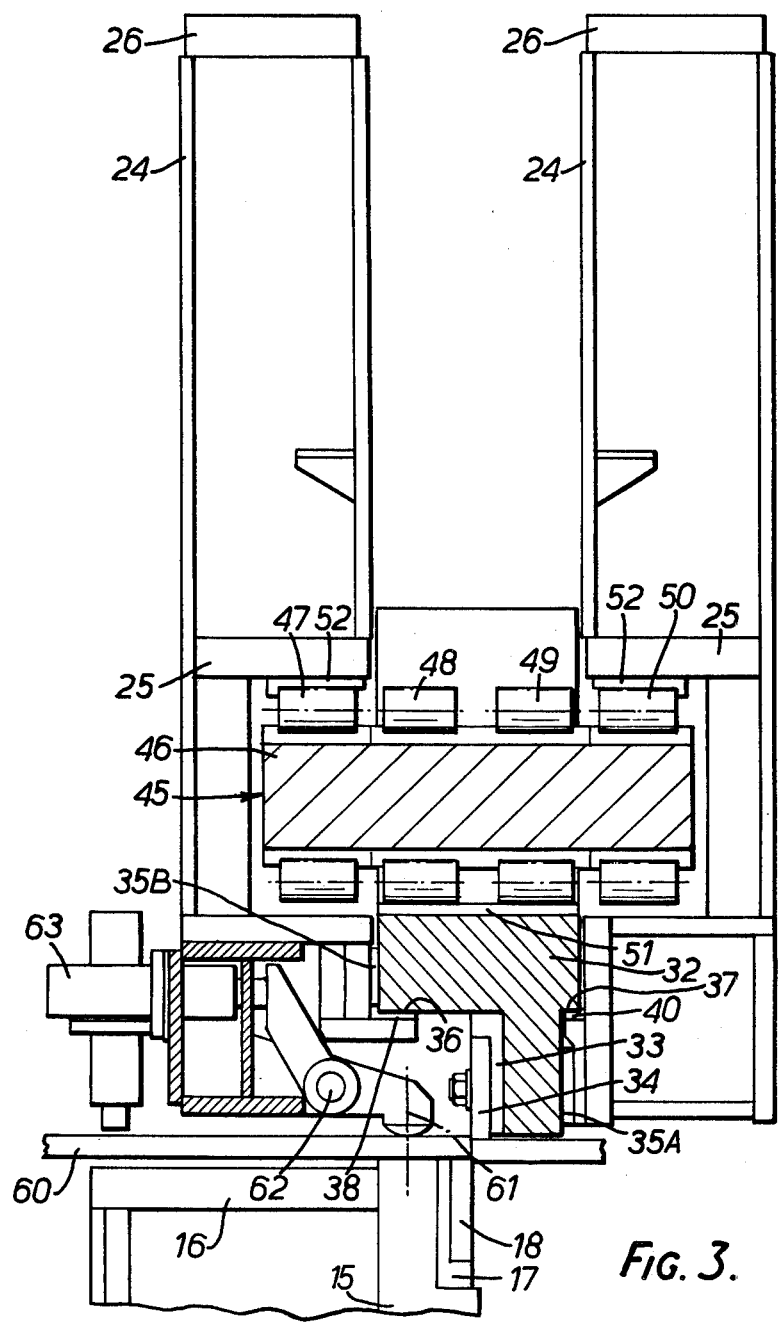

The invention will be more readily understood by way of example from the following description of rolling cut shear constructions, reference being made to the accompanying drawings, in which FIGS. 1 and 2 are respectively a side view and an end view of one form of rolling cut shear, FIG. 3 is a vertical section through the shears of FIGS. 1 and 2, taken at right angles to the length of the blades, FIG. 4 is a view at right angles to that of FIG. 3, showing in the left hand half a hold-down cylinder and in the right hand half a caterpillar carriage, FIGS. 5 and 6 show in side view and end view an auxiliary resetting mechanism.

Figure 7:
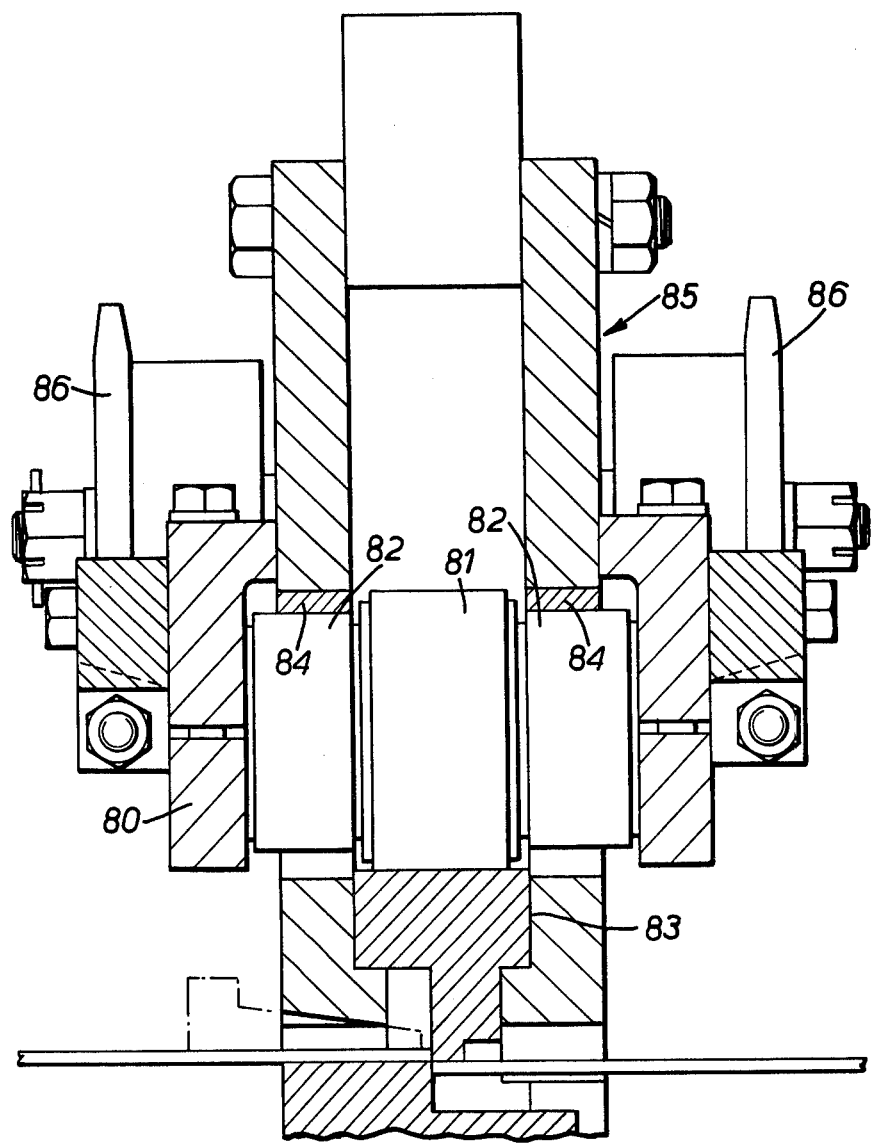
Figure 8:
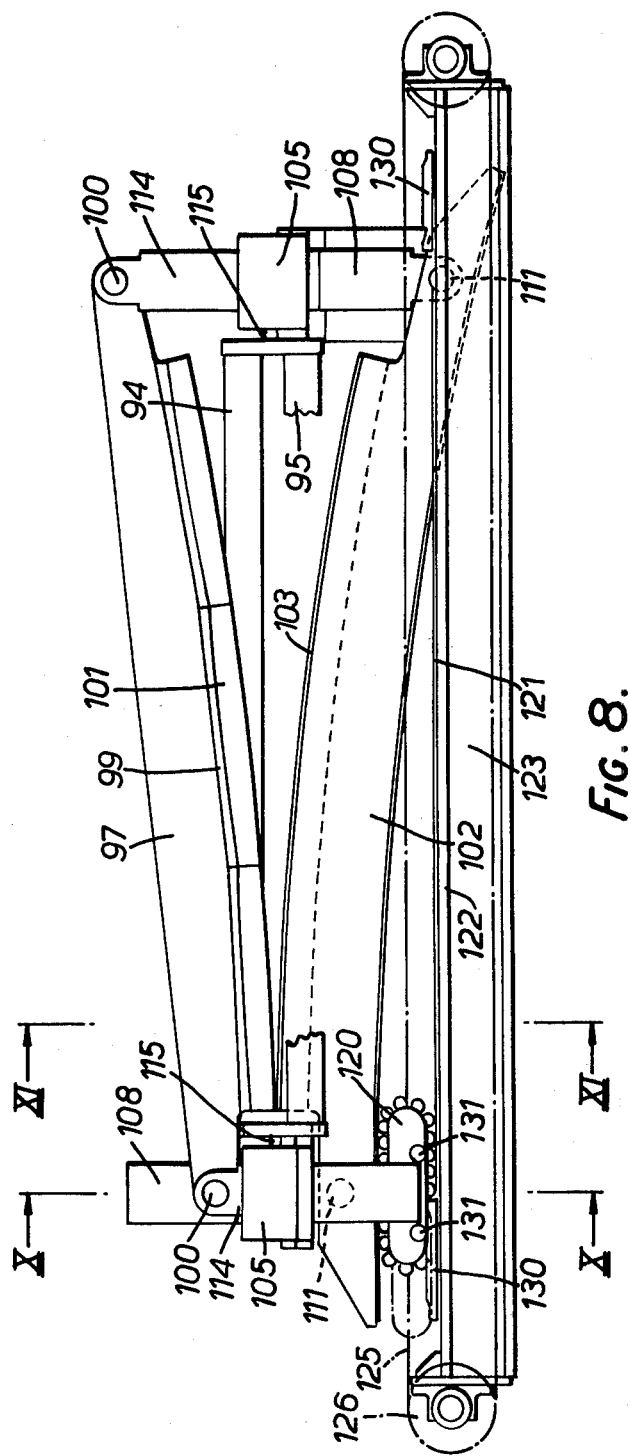
Figure 10:
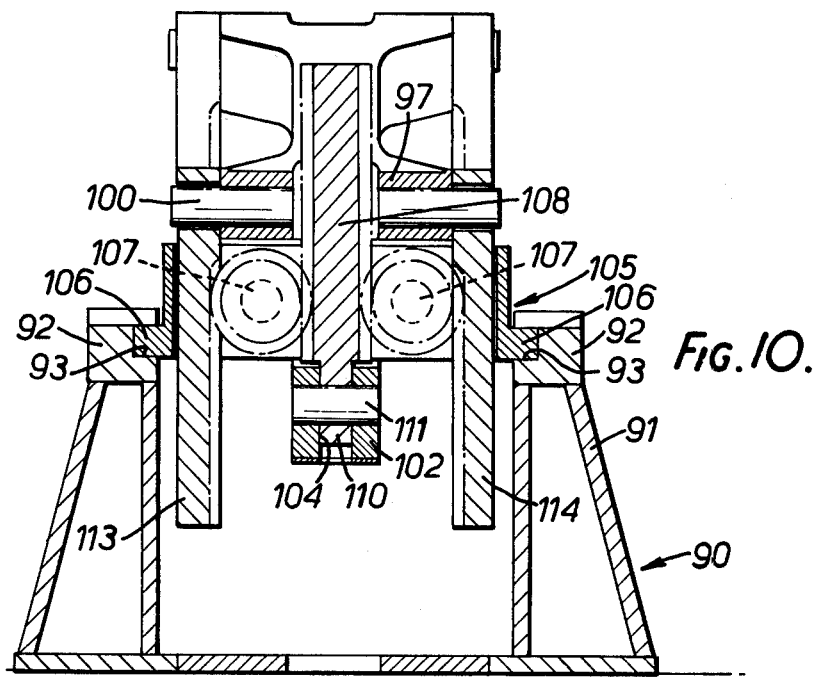
Figure 11:
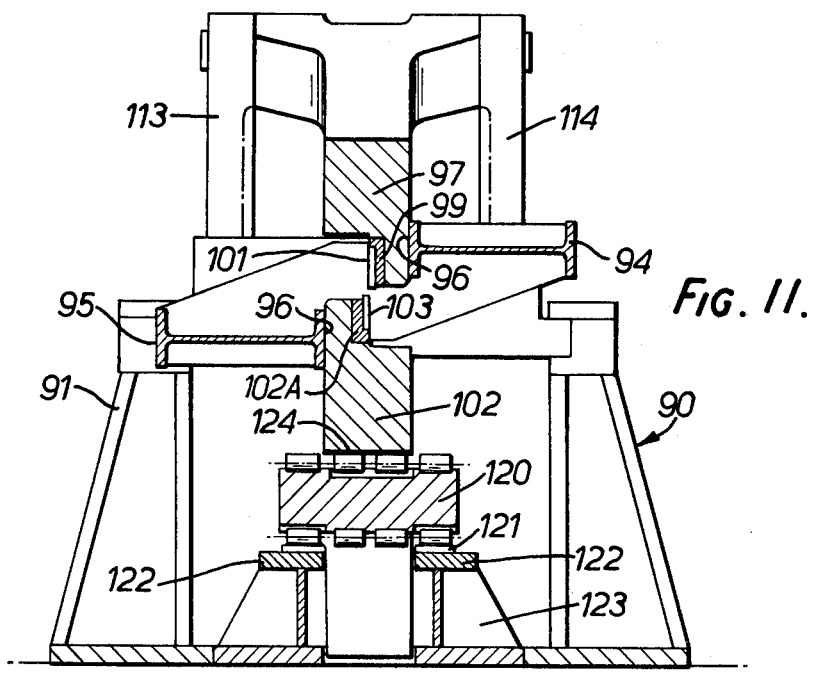
Figure 12:
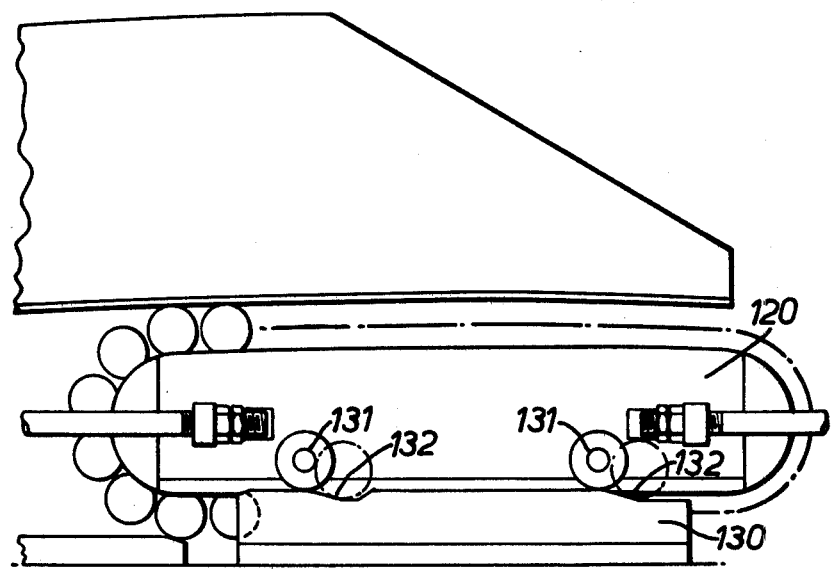
Figure 13:
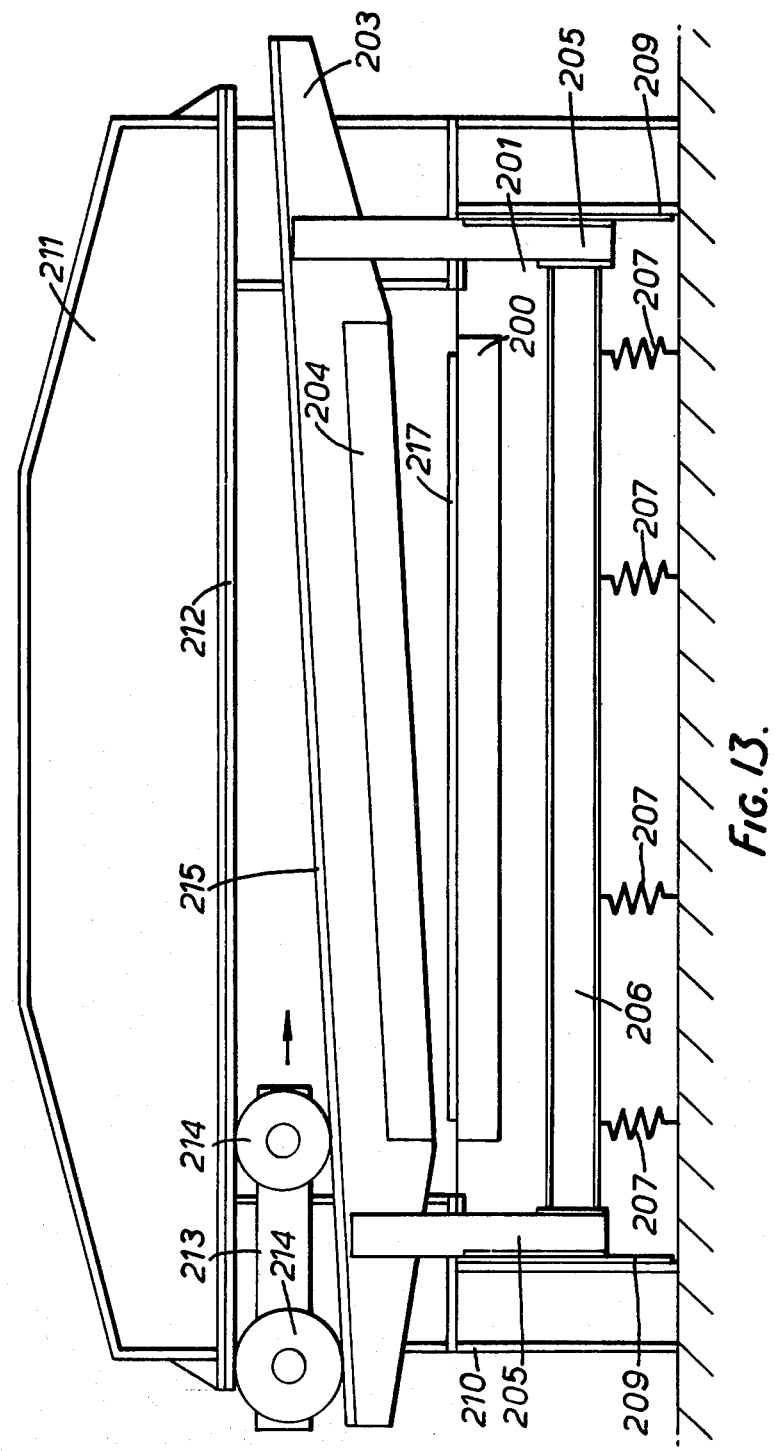

FIG. 7 is a view similar to that of FIG. 3, showing an alternative form of carriage, FIG. 8 is a schematic side view, and FIG. 9 a plan view, of an alternative form of rolling cut shear with some parts broken away for clarity, FIGS. 10 and 11 are cross-sections on lines X—X and X1—X1 of FIG. 9 with the carriage omitted from FIG. 10 and shown in FIG. 11 for convenience, FIG. 12 shows a detail of the end of the shear of FIG. 8, and FIG. 13 illustrates schematically in side view a raked blade shear.

The rolling cut shear illustrated in FIGS. 1 to 6 of the drawings has a pair of spaced rectangular housings 12 and 13 which are bolted to the foundations and which are connected together by overhead cross-beams 14. At the base and between the housings, 12, 13 is located a fixed blade structure which is also bolted to the foundations. The structure comprises an L-shaped member 15 secured to a transverse plate 16; a fixed blade holder 17 is attached to the member 15 and the holder 17 in turn secures the fixed blade 18.

A main frame for the moving blade assembly, which is indicated at 20, is shown at 21 and extends through the two housings 12 and 13. The main frame 21 is supported by four screw jacks 22 which are carried in the bottoms of the windows of the housings. The main frame includes two transversely-spaced box-girders 24, between which the moving blade assembly 20 is located. Each box girder 24 is closed top and bottom of heavy plates 25 and 26 which extend the full length of the main frame 21. The main frame 21 is also engaged at each end by a hydraulic piston and cylinder assembly 27, and carries two pairs of wedges 28 operated by further piston and cylinder assemblies 30. The wedges 28 are moved between operative positions received in guides lying between the upper plates 26 and the top of the housings 12, 13 as shown, and an inoperative position withdrawn from those housings.

The moving blade assembly 20, unlike the fixed blade assembly, is curved in side view, (see FIG. 1). It consists of an inverted L-shaped curved beam 32 carrying a blade holder 33 which in turn has bolted to it the moving shear blade 34, the exposed side face of the blade 34 being in approximately the same plane as the exposed side face of the fixed blade 18 (see FIG. 3). Transverse movement of blade 34 relative to blade 18 is limited in both directions by wear plates 35A and 35B carried by the adjacent main frame 21. The wear plates may be replaced by roller type thrust bearings on the main frame to reduce frictional forces causes by the transverse blade separating forces. The beam 32 is formed with two shoulders 36 and 37 overlying two supporting plates 38 and 40 respectively carried by the main frame. In the absence of work, the moving blade assembly rolls on the plates 38 and 40.

The moving blade assembly 20 is unrestrained between the box sections 24, apart from the caterpillar carriage, to be described hereinafter, and a pair of balance cylinders 41 which are secured between the main frame 21 and the opposite sides of the beam 32 at the approximate centre of gravity of the moving blade assembly, and which simply support the weight of the moving blade assembly.

A carriage 45 is movable along the shear, between the plates 25 and the moving blade assembly 20. The carriage consists of a central beam 46 carrying four sets of rollers 47, 48, 49 and 50, of which rollers 47 and 50 are located beneath the plates 25 and the rollers 48 and 49 are located above the moving blade assembly 20. As shown in FIG. 4, each set of rollers consist of a large number of individual rollers carried in tracks on the central beam 46 and connected to the next by a continuous chain; above the central beam 46, the roller tracks extend parallel to the flat faces of the beam 25, whereas the curvature of the tracks below the beam 45 have the same curvature as the upper face of beam 32 of the moving blade assembly 20. Rollers 48 and 49 roll on a wear plate 51 carried on the upper face of beam 32, while rollers 47 and 48 roll on wear plates 52 secured on the under sides of plates 25.

The carriage 45 can be drawn through the main frame 21, in either direction, by two endless chains 55 the ends of each of which are secured to opposite ends of the carriage 45 and each of which passes over sprockets 56 carried at the ends of main frame 21. One or both of the sprockets 56 for each chain is driven by a reversible electric motor.

A plate to be sheared is indicated at 60 in FIG. 1, the plate being entered between the two blades 18, 34 by being introduced between the housings 12 and 13. Before the shear, the plate 60 is held down by a gag 61 which is pivoted about a pin 62 and operated by piston and cylinder assemblies 63. The plate 60 is also restrained by a vertical hold down piston and cylinder assembly 64 (see FIG. 4) acting between the main frame 21 and the upper face of the plate.

The shear operates as follows:

Assuming that a new thickness of plate is to be sheared, the wedges 28 are in their retracted positions and the main frame 21 is lifted off the jacks 22 by the hydraulic piston and cylinder assemblies 27. The plate 60 to be sheared is positioned between the two blades and the blade gap is adjusted for the required blade penetration by adjustment of the jacks 22. Cylinder assemblies 27 are depressurised to lower the main frame on to the jacks 22 and the wedges 28 are relocated in their operative positions shown in FIGS. 1 and 2. Next, gag 61 is operated by the cylinder assembly 63 and the hold down assembly 64 is similarly activated.

When those steps have been performed, the shear stroke itself is effected. For that purpose, the caterpillar carriage is traversed across the main frame 21 by means of the chains 55, from one end to the other. As the carriage is moved between plates 25 and the moving blade 20, each set of rollers 47–50 move in caterpillar fashion around the central part 45 so that only rolling friction is encountered. The carriage is restrained vertically by the engagement of rollers 47 and 50 with the plates 25, while the rollers 48 and 49 bear on the moving blade assembly 20 and apply the shearing force to the blade assembly, where the moving blade 34 is in contact with the plate 60. The movement of the carriage 45 also causes the moving blade assembly 20 to roll on the plate 60, the assembly 20 being unrestrained at its ends, with the consequence that the plate 60 is progressively sheared from one edge to the other.

If the plate 60 is flat, then, after shearing the gags are released and the plate 60 may simply be withdrawn from the shear. Otherwise, the gags are released, the screw jacks 22 are backed off, wedges 28 withdrawn and the main frame 21 raised by the piston and cylinder assemblies 27 before the plate is withdrawn. The screw jacks 22 are then reset prior to introduction of the next plate to be sheared. For the next shear stroke, the drive motor or motors is or are operated in reverse direction, the carriage 45 effecting the shear in returning to its initial position.

Because the moving blade assembly 20 is unrestrained in its lengthwise dimension, it may be necessary to reset its position after each stroke. For that purpose, the blade holder 33 has adjacent each end a downwardly projecting finger 70, which, at the end of the appropriate stroke, is received between an upward projection 71 slidably mounted on a shaft 72, and a fixed stop 73 on the main frame. Projection 71 can be traversed between stop 73 and a further stop 74 by means of the piston 75 of a cylinder 76. Before the moving blade assembly reaches the end of its traverse, projection 71 is placed in the position shown in chain line in FIG. 5 adjacent the stop 74. If finger 70 is not in the proper position shown in full line in FIG. 5, e.g. in the position shown in chain line, cylinder 76 is operated to draw the projection 71 towards the stop 73 and thereby to move the finger 70 into the reset position adjacent stop 73.

Of course, alternative resetting mechanisms can be employed. Thus a projection on the end of the moving blade may be arranged to contact a buffer suitably positioned on the carriage, so that at the end of the cutting stroke the carriage automatically resets the blade.

An alternative carriage construction is shown in FIG. 7. In this construction, the caterpillar arrangement is replaced by a carriage 80 in which are journalled two sets of roller bearings each set having an inner roller 81 flanked by outer rollers 82 of reduced diameter. The inner rollers 81 roll on the upper surface of the moving blade assembly 83 while the outer rollers 82 bear on wear surfaces 84 of main frame 85. The carriage 80 is moved horizontally in the same way as the carriage of FIGS. 1 to 6, by means of chains (not shown) the ends of which pass over sprockets 86 arranged at the ends of the shear. This construction has advantages over the caterpillar construction described above in that the construction is simpler and easier to lubricate.

The shear as described above illustrated in the drawings has the following advantages:

1. The moving blade 34 of necessity performs a true rolling motion on the plate 60 resulting in a sheared plate with a minimum amount of distortion.

2. The shearing force is applied directly to the moving blade assembly 20, where the moving blade engages the plate; in fact the separating force is concentrated on a relatively small length of the moving blade assembly centred on the point of cut.

3. The shearing force applied to the rolling blade assembly is substantially uniform throughout the progressive shearing of the plate 60. As a result of 2 and 3, no peak loads are developed and blade holder bending stresses are minimised.

4. As a consequence of 3, the motors require a smaller peak power for the same plate thickness to be sheared and can have a lower peak power relative to known shears.

5. The shear has a low headroom because of its simple design. The shear is thus lighter and smaller than known shears of comparable capacity.

6. Higher efficiency is achieved by virtue of the use of rolling elements to transmit the shearing loads.

7. The supporting structure of the shear is stiffer by virtue of the application of the shearing forces to the moving blade adjacent the point of cut and, as a consequence, better control of penetration is achieved.

8. The moving blade is guided and supported at all times during the cut, giving good control of the blade gap and penetration.

9. As there are only two moving parts, the blade and the carriage, there is a minimum of maintenance.

10. The shear is operable in either direction.

11. A mechanical advantage of the order of 15 to 20:1 can be obtained. Thus, a plate requiring a shearing load of 1 ton can be sheared by applying a tractive load of 130-lb to the carriage.

Various modifications are of course possible. Thus, the carriage 45 may be traversed by means of long-stroke piston and cylinder assemblies, rather than by the chain 55 driven by electric motors. Also, the shear may be employed otherwise than as a cross-cut shear. Thus, it may act as a side trimming shear with suitable modification of the housings 12 and 13 to allow the edge of the plate to be entered between the blades.

Although the shear described above is intended primarily for metals, it may also be used for shearing plastics, cardboard or wood. Although a shearing device has been described above, the invention is also applicable to cutting devices which do not completely shear the workpiece, for example in slitting, and to shaping devices for pressing, forging or stamping. Further, although the device has been described as operating in a vertical direction with a horizontally moving carriage, other orientations are possible.

The device described with reference to FIGS. 1 to 7 shows a shear having a single moving blade cooperating with a fixed blade. FIGS. 8 to 12 show an alternative construction in which two moving blades are employed.

The shear of FIGS. 8 to 12 has a supporting framework consisting of a spaced pair of end frames 91, each of which supports laterally spaced slides 92 having slideways 93 facing one another. The frames 91 are linked longitudinally by two H-section horizontal beams 94, 95, which are offset both vertically and horizontally and which are secured together at their ends. Beams 94 and 95 are parallel and have inner faces 96 which are spaced from one another and form bearing surfaces for the moving blade assembly.

The upper moving blade assembly comprises a curved upper shear beam 97, each end of which is forked, as shown in FIG. 9; each fork 98 at each end carries a stub shaft 100, extending laterally from the fork. Upper shear beam 97 mounts a blade holder 99 to which is attached an upper curved blade 101.

The lower moving blade assembly consists of a curved lower shear beam 102, carrying curved lower blade holder 102A (identical to holder 99) and curved lower blade 103 (identical to blade 101), the curvatures of the two blades being equal and opposite. Lower shear beam 102 is slotted at each end, as shown at 104 in FIG. 10.

Carried by each frame 91 is a pinion box 105, which has a pair of outwardly extending lugs 106 received in the slideways of the respective slides 92. A pair of pinions 107 are mounted within each pinion box for free rotation about parallel horizontal axes. An upwardly extending rack 108, having rack teeth on each side, is located between the pinions 107 and meshes with each; the upper extremity of rack 108 can move freely vertically between the forks 98 at the appropriate end of the upper shear beam 97. At its lower end, the rack 108 has a downwardly projecting tongue 110 lying within the slot 104 of the lower shear beam 102, to which it is pivoted by a pin 111. Lower shear beam is thus mounted and carried by the pins 111 of the racks 108 at each end of the structure.

The stub shafts 100, at each end of the upper shear beam 97, are journalled in respective, vertical, racks 113 and 114 which pass through the respective pinion box and have rack teeth meshing with the pinions 107, as shown in FIG. 10. As will be apparent, each racks 113, 114 is on the side of the respective pinion 107 opposite to central rack 108, with the consequence that vertical movement of one end of lower shear beam 102 in one direction is accompanied by an equal movement of the same end of the upper shear beam 97 in the opposite direction. The two shear assemblies with the racks and pinions form a balanced system with no need for any other support for the blade holders during an idle stroke, the weight of the blade assemblies being carried by the slides 92 through the pinion boxes 105. Since pins 100 and 111 trace cycloidic paths during the cutting stroke, the pinion boxes are movable in the slides 92 to accommodate the slight horizontal displacements that they will experience. The boxes, however, are restrained by springs 115 and are returned to their neutral positions on completion of each cut.

The moving blade assemblies are actuated by a caterpillar carriage 120, similar to carriage 45 of FIGS. 1 to 6. Alternatively, a carriage fitted with roller bearings, as shown in FIG. 7, may be used. Carriage 120 is mounted immediately below lower blade holder 102 and its outer rollers bear on wear plates 121 on the upper surface of tracks 122 supported by a framework 123, extending beyond each end of the moving blade assembly. The inner rollers of the carriage are engaged by wear surface 124 on the lower face of lower blade holder 102. The carriage is moved horizontally over the tracks 122 by means of a pair of endless chains 125 passing round sprockets 126.

Horizontal movement of carriage 120 from one end to the other causes the lower blade 103 to roll on the under surface of a workpiece (not shown) positioned between the two blades and supported by a shear table (not shown). Because any movement of either end of the lower shear beam 102 is accompanied by an equal and opposite movement of the same end of the upper shear beam 97, the upper blade 101 is caused to roll in the opposite sense on the upper face of the workpiece. The arrangement of rack 108, pinions 107, and racks 113, 114 also transfer the necessary cutting force from the lower shear beam to the upper shear beam 97. During the cutting operation, the shear beams are laterally restrained by the bearing surfaces 96 of the beams 94, 95 to which the horizontal blade separating forces are applied.

As two rolling blades are employed in the shear of FIGS. 8 to 12, for a given radius of blade curvature, the effective rake angle is doubled when compared with a single curved blade, and the necessary cutting force is reduced. Alternatively, the radius of the blade curvature may be increased while still keeping the same cutting force as would be required for a single curved blade of smaller radius or curvature. Increasing the radius of curvature reduces the distortion of the edge of the workpiece being sheared.

The shear construction of FIGS. 8 to 12 has the further advantage that its carriage, with its supporting and actuating equipment, is mounted below the blades. Consequently, no deep horizontal beams are required above the carriage to accommodate the cutting force, allowing a reduction in height, while access to the cutting blades is facilitated. Carriage 120 could alternatively be arranged above the upper shear beam 97 to act on that holder, provided appropriate restraint is supplied.

FIG. 12 shows means for providing a clearance between the blades at the beginning and end of the cutting stroke to allow entry and removal of the workpiece. Thus, at each end of the shear, the wear plates 121 on which carriage 120 rides stop short of the end of base member 106 and, instead, the carriage 120 passes on to pairs of additional plates 130 which project somewhat higher than wear plates 121. The carriage 120 has two pairs of side rollers 131 for that purpose. The plates 130 have recesses 132 in their upper faces and at the end of a stroke, the rollers 131 reach the recesses of one or other of plates 130 and the carriage 120 is lowered slightly. This lowers the bottom shear beam 102 by a small amount and in consequence raises the upper shear beam 97. The resulting separation of the blades at that end then allows the workpiece to be withdrawn or a new workpiece inserted.

As will be appreciated, the shear beams 97 and 102, unlike those of FIGS. 1 to 7, are subject to bending stress since the cutting forces are transmitted to the upper shear blade 101 through beam 102, the racks and pinions and beam 97. Generally the stressing of the beams can be accommodated by appropriate dimensioning, the increased size being more than compensated by the absence of any structure above the upper beam 97. However, the bending moments may be eliminated if desired by providing a duplicate carriage, drive mechanism and support system above the beam 97; the two carriages are then moved in synchronism and each applies to its associated shear beam and shear blade a cutting force concentrated at the point of shear.

The embodiments described above are of rolling blade shears, having either one curved moving blade and a fixed straight-edged blade or two curved moving blades. The shear shown in FIG. 13 is a raked blade shear employing a raked straight-edged moving blade.

The shear of FIG. 13 has a fixed blade 200 carried by a floor mounted bottom bolster 201. A shear beam 203 carries a raked upper blade 204 and is supported at a constant inclination by four vertical members, of which two are shown at 205, a tie 206 rigidly connecting the members 205, and a number of springs 207 located between the tie and the floor. Members 205 are guided for vertical movemet by guides 208 on the shear frame 210.

The shear frame 210 includes a top beam 211 located above the shear beam 203 and carrying on its lower face a horizontal wear plate 212. A carriage 213 having two pairs of wheels 214 lies between the top beam 211 and the shear beam 203 with the wheels engaging wear plate 212 and a wear plate 215 on the upper face of the shear beam 203. The carriage is coupled to a mechanism for drawing it lengthwise along beam 203 and returning it to the position shown, that mechanism being preferably as described above in connection with the earlier embodiments. As will be apparent from the drawing, one pair of wheels of the carriage 213 has a smaller diameter than the other pair, the difference in diameter being chosen to maintain the required angle of rake of the upper blade 204 during the traverse of the carriage. Springs 207 exert an upward force on the tie 206 and the shear beam 203 exceeding the dead weight of the upper blade assembly 203, 204, 205 and the carriage so that beam 203 is held up against the carriage when the shear is immobile and during the idle return stroke.

At the start of a shear operation, the carriage 214 is in the position shown, a workpiece 217 is placed between the blades and the drive mechanism for the carriage is actuated. As the carriage traverses, it forces the shear beam 203 and the upper blade 204 downwardly against the action of the springs 207, the rake of blade 204 being however kept constant by the parallel motion linkage constituted by members 205 and tie 206. The blade is thus forced against and through the workpiece 217, the cutting position lying immediately below the carriage. As the carriage continues to traverse the cutting position progresses correspondingly along the workpiece until the shear is completed. As the carriage and cutting position are always aligned, the shear beam is subject to only insignificant bending moments.

Unlike the shears of FIGS. 1 to 12, that of FIG. 13 cannot operate in each direction of travel of the carriage, successive cutting strokes being alternated with idle return strokes.

We claim:

1. A shear mechanism comprising:
   a. a movable first shear blade assembly, which includes a shearing face and an oppositely directed and generally similarly shaped bearing face both extending over substantially the entire length of said blade assembly;
   b. a second blade assembly cooperating with said first assembly to shear a workpiece therebetween;
   c. a fixed support spaced from said first assembly and extending substantially over the length of said first assembly;
   d. a carriage located operatively between, and engaging, said support and said bearing face, said carriage contacting said bearing face over a limited length thereof; and
   e. means for moving said carriage progressively along the length of said bearing face;
   f. whereby said shearing face is urged progressively into shearing engagement with said workpiece, and shearing force is applied by said carriage to a limited part of the length of said first assembly at the location of shearing engagement.

2. A shear mechanism as claimed in claim 1, wherein said shearing face of said first assembly is raked and is inclined to said second assembly.

3. A shear mechanism as claimed in claim 2, wherein said carriage has wheels of different diameter engaging both said support and said bearing face, whereby said raked first assembly is moved progressively towards said fixed assembly as said carriage traverses said raked first assembly.

4. A shear mechanism as claimed in claim 2, further comprising a parallel motion linkage supporting said raked first assembly and biasing said raked first assembly away from said second blade assembly and against said carrige.

5. A rolling cut shear comprising:
  a. a movable first shear blade assembly, which includes a curved shearing face and an oppositely directed and generally similarly shaped bearing face both extending over substantially the entire length of said blade assembly, said first blade assembly being tiltably movable;
  b. a second blade assembly cooperating with said first assembly to shear a workpiece therebetween;
  c. a fixed support spaced from said first assembly and extending substantially over the length of said first assembly;
  d. a carriage located operatively between, and engaging, said support and said bearing face, said carriage contacting said bearing face over a limited length thereof; and
  e. means for moving said carriage progressively along the length of said bearing face;
  f. whereby said shearing face is rolled progressively into shearing engagement with said workpiece, and shearing force is applied by said carriage to a limited part of the length of said first assembly at the location of shearing engagement.

6. A rolling cut shear as claimed in claim 5, wherein said second blade assembly is fixed, said workpiece being disposed thereon.

7. A rolling cut shear as claimed in claim 5, wherein said first and second assemblies are oppositely curved and are both movable, and there are means for transferring an opposite shearing force to said second movable blade assembly for said first assembly, to cause both said assemblies to roll on said workpiece and to apply shearing forces progressively along the length of said blade assemblies in order to shear the work.

8. A rolling cut shear as claimed in claim 5, wherein said fixed support has plates adapted to cause the carriage to be lowered at the ends of its travel and cause separation of said blade assemblies.

9. A rolling cut shear as claimed in claim 7, wherein said force transferring means comprise two rack and pinion mechanisms connected between the respective ends of said two assemblies.

10. A rolling cut shear as claimed in claim 5, wherein said rolling carriage includes caterpillar rollers, inner sets of which bear on said first blade assembly and outer sets of which bear on said fixed support.

11. A rolling cut shear as claimed in claim 5, wherein said rolling carriage includes sets of roller bearings, of which inner rollers bear on said first blade assembly, and outer rollers bear on said fixed support.

12. A rolling cut shear as claimed in claim 5, further comprising means for resetting said first blade assembly to a predetermined longitudinal position after a shearing stroke.

13. A rolling cut shear as claimed in claim 12, wherein said resetting means comprise a projection on said first blade assembly, a movable abutment adapted to engage said projection and to move said projection against a stop.

* * * * *